United States Patent
Ban

(10) Patent No.: US 11,989,469 B2
(45) Date of Patent: May 21, 2024

(54) IMAGE FORMING APPARATUS AND CONTROL METHOD FOR PERMITTING USE OF CONSUMABLE HAVING BEEN USED IN ONE APPARATUS IN ANOTHER APPARATUS

(71) Applicant: BROTHER KOGYO KABUSHIKI KAISHA, Nagoya (JP)

(72) Inventor: Naomichi Ban, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/187,064

(22) Filed: Mar. 21, 2023

(65) Prior Publication Data
US 2023/0315360 A1 Oct. 5, 2023

(30) Foreign Application Priority Data
Apr. 1, 2022 (JP) .................. 2022-062145

(51) Int. Cl.
*G06F 3/12* (2006.01)
(52) U.S. Cl.
CPC .......... *G06F 3/1239* (2013.01); *G06F 3/1204* (2013.01); *G06F 3/121* (2013.01); *G06F 3/1229* (2013.01)
(58) Field of Classification Search
None
See application file for complete search history.

(56) References Cited

U.S. PATENT DOCUMENTS

| 2018/0131831 A1* | 5/2018 | Tolia ..................... G06F 3/1229 |
| 2021/0237494 A1* | 8/2021 | Mikami .................. B41J 29/38 |
| 2022/0171583 A1 | 6/2022 | Suzuki |

FOREIGN PATENT DOCUMENTS

JP 2022-85744 A 5/2022

* cited by examiner

*Primary Examiner* — Andrew H Lam
(74) *Attorney, Agent, or Firm* — Merchant & Gould P.C.

(57) ABSTRACT

A consumable memory of a consumable stores type information and first information. The type information indicates whether the consumable is a contract consumable or a normal consumable. The contract consumable is usable when a contract for an image forming apparatus is made. The normal consumable is usable regardless of whether the contract is made. The first information indicates whether the consumable is a new consumable or a used consumable. An external memory is physically connectable to a main housing from outside the main housing. A controller is configured to: determine whether the type information is information indicating the contract consumable; and in response to determining that the type information is information indicating the contract consumable, store second information in the external memory. The second information is information for permitting a use of the consumable in another image forming apparatus different from the image forming apparatus.

18 Claims, 8 Drawing Sheets

IMAGE FORMING APPARATUS AND CONTROL METHOD FOR PERMITTING USE OF CONSUMABLE HAVING BEEN USED IN ONE APPARATUS IN ANOTHER APPARATUS

REFERENCE TO RELATED APPLICATIONS

This application claims priority from Japanese Patent Application No. 2022-062145 filed on Apr. 1, 2022. The entire content of the priority application is incorporated herein by reference.

BACKGROUND ART

In recent years, flat-rate printing services have been provided to users of image forming apparatuses.

DESCRIPTION

A flat-rate printing service is also called a subscription service, and is a service that may be subscribed to for each image forming apparatus. For example, in an image forming apparatus which is a contracted apparatus for which a contract regarding a use of a flat-rate printing service has been made, printing is permitted up to a preset number of sheets for a certain usage fee during a particular period.

Generally, when using a flat-rate printing service, a service provider often specifies that contract consumables dedicated for the flat-rate printing service should be used in a contracted image forming apparatus. In this case, a mechanism is required to ensure proper use of contract consumables in contracted apparatuses.

In order to ensure proper use of contract consumables, for example, it is conceivable to distinguish between contract consumables and normal consumables that can be used regardless of subscription to a service. Also, it is conceivable to associate and manage contract consumables and contracted apparatuses so that contract consumables are used in specific contracted apparatuses.

In this case, there is a problem that operations performed by the user become complicated when changing the contracted apparatus. In view of the foregoing, an example of an object of this disclosure is to enable a user to easily switch from an image forming apparatus currently used by the user to an image forming apparatus to be used instead of the image forming apparatus currently used by the user.

According to one aspect, this specification discloses an image forming apparatus. The image forming apparatus includes a main housing, a consumable, an external memory, and a controller. The consumable is attachable to the main housing. The consumable includes a consumable memory. The consumable memory stores type information and first information. The type information indicates whether the consumable is a contract consumable or a normal consumable. The contract consumable is a consumable that is usable when a contract for the image forming apparatus is made. The normal consumable is a consumable that is usable regardless of whether the contract is made. The first information indicates whether the consumable is a new consumable or a used consumable. The external memory is physically connectable to the main housing from outside the main housing. The controller is configured to determine whether the type information is information indicating the contract consumable. The controller is configured to, in response to determining that the type information is information indicating the contract consumable, store second information in the external memory. The second information is information for permitting a use of the consumable in another image forming apparatus (new apparatus) different from the image forming apparatus (old apparatus). Thus, when a user attaches the external memory storing the second information to the new apparatus and attaches the consumable having been used in the old apparatus to the new apparatus, the new apparatus recognizes that the external memory stores the second information. Thus, the new apparatus refers to the second information stored in the external memory and permits the use of the consumable. This allows a user to use, in the new apparatus, a contract consumable having been used in the old apparatus by attaching the external memory and the consumable to the new apparatus.

This specification also discloses a control method. According to the control method, a first image forming apparatus (old apparatus) stores second information in an external memory. A consumable memory stores second information. Thus, when a user connects the external memory storing the second information to a new apparatus and attaches a consumable having been used in the old apparatus to the new apparatus, the new apparatus recognizes that the consumable memory and the external memory store the second information. The new apparatus permits the use of the consumable based on a determination that the second information stored in the consumable memory and the second information stored in the external memory match.

EMBODIMENT 1

An embodiment of the present disclosure will be described below with reference to FIGS. 1 to 6. In this embodiment, as an example, a case where an image forming apparatus 1 is a laser printer and image formation is printing will be described. However, the image forming apparatus may be a printer other than a laser printer. For example, the image forming apparatus 1 may be an inkjet printer.

[Overview of Image Forming System]

Figure 1:
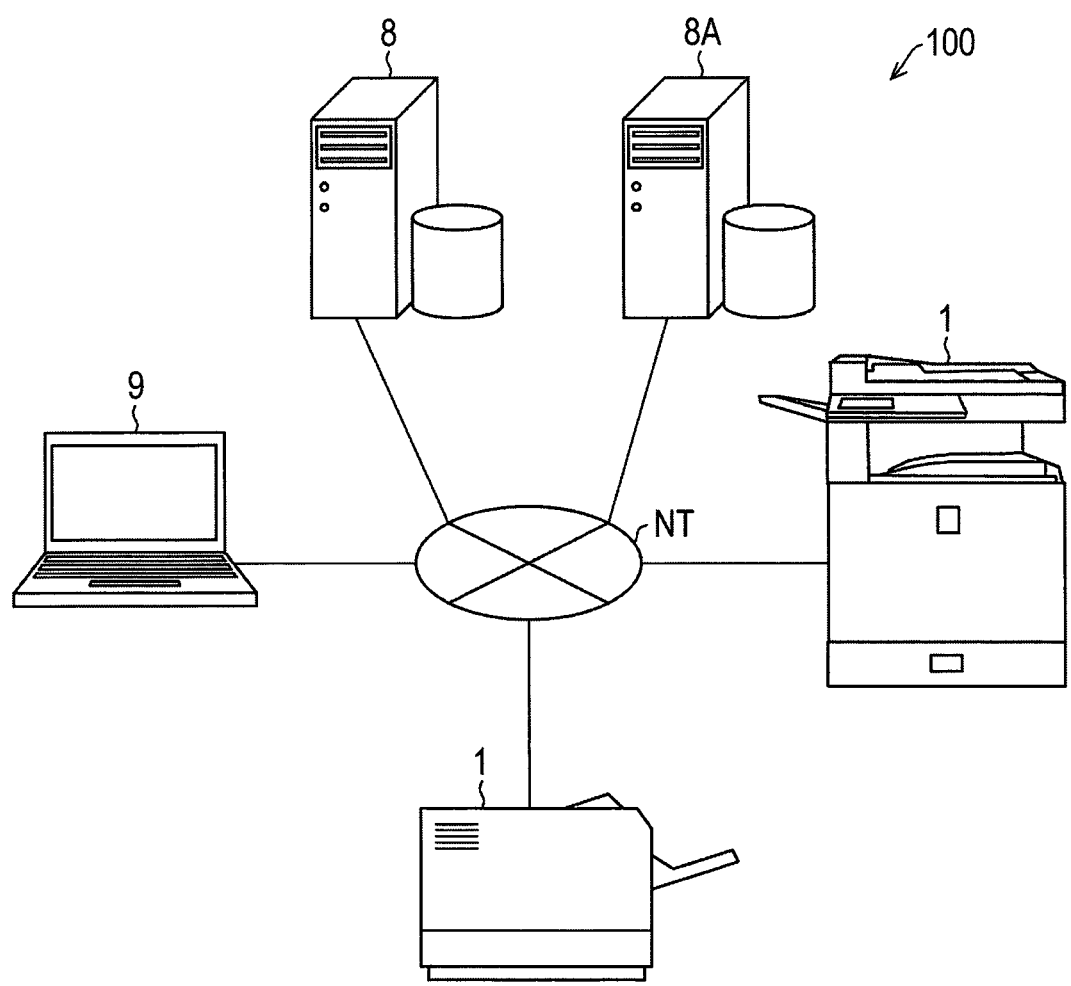
FIG. 1 is a diagram showing an overview of an image forming system.

FIG. 1 shows an overview of an image forming system 100 according to this embodiment. As shown in FIG. 1, the image forming system 100 includes a plurality of image forming apparatuses 1, a data processing server 8, a transaction server 8A, and a user terminal 9. The plurality of image forming apparatuses 1 shown in FIG. 1 are purchased by the same user. However, although not shown, the image forming system 100 may include still another image forming apparatus purchased by another user.

The image forming apparatus 1 is an apparatus for implementing services provided by a contract for the image forming apparatus 1. The data processing server 8 is an external apparatus that communicates with the image forming apparatus 1 via a network NT, and is an example of a management apparatus that manages the image forming apparatus 1. In this embodiment, the data processing server 8 and the transaction server 8A are servers managed by a company.

A "contract" in the present embodiment is a contract made between a user and a company, in which the company provides a particular service via the image forming apparatus 1 specified by the user. In other words, it can be said that the user makes a contract for a certain image forming apparatus 1. Further, it can be said that the image forming apparatus 1 is an apparatus of the target of contract. Hereinafter, the image forming apparatus 1 specified by the user and subject to the contract will be referred to as a "contracted apparatus (contract target apparatus)".

In each of the plurality of image forming apparatuses 1, contract-dedicated consumables are usable when the user makes a contract with the company. As an example, a contract is an agreement between a user and a company that provides a contract service that the company provides the service to the user by setting the period of use of the service, the usage fee, the maximum number of sheets, and so on. That is, the image forming apparatus 1 of the present embodiment is an image forming apparatus that is allowed to, after a service contract is made, perform contract printing which is printing based on the content of the contract.

The user is allowed to register or change the image forming apparatus 1 as a contracted apparatus at any timing. The "registration" referred to here may be new registration or re-registration of an image forming apparatus 1 that has been previously registered and whose contract has been cancelled. Also, the user is allowed to register a plurality of image forming apparatuses 1 as contracted apparatuses. That is, the user can simultaneously use a plurality of image forming apparatuses 1 as contracted apparatuses, or change the image forming apparatus 1 used as a contracted apparatus from one image forming apparatus 1 to another image forming apparatus 1.

The user terminal 9 used by the user is an apparatus for communicating with the data processing server 8 to make and cancel a contract and execute other procedures. The user terminal 9 may be, for example, an information processing terminal having a standard communication function, such as a PC (personal computer) or a smart phone. Each apparatus constituting the image forming system 100 communicates with each other via a communication network such as the Internet.

[Overview of Structure of Image Forming Apparatus 1]

Figure 2:
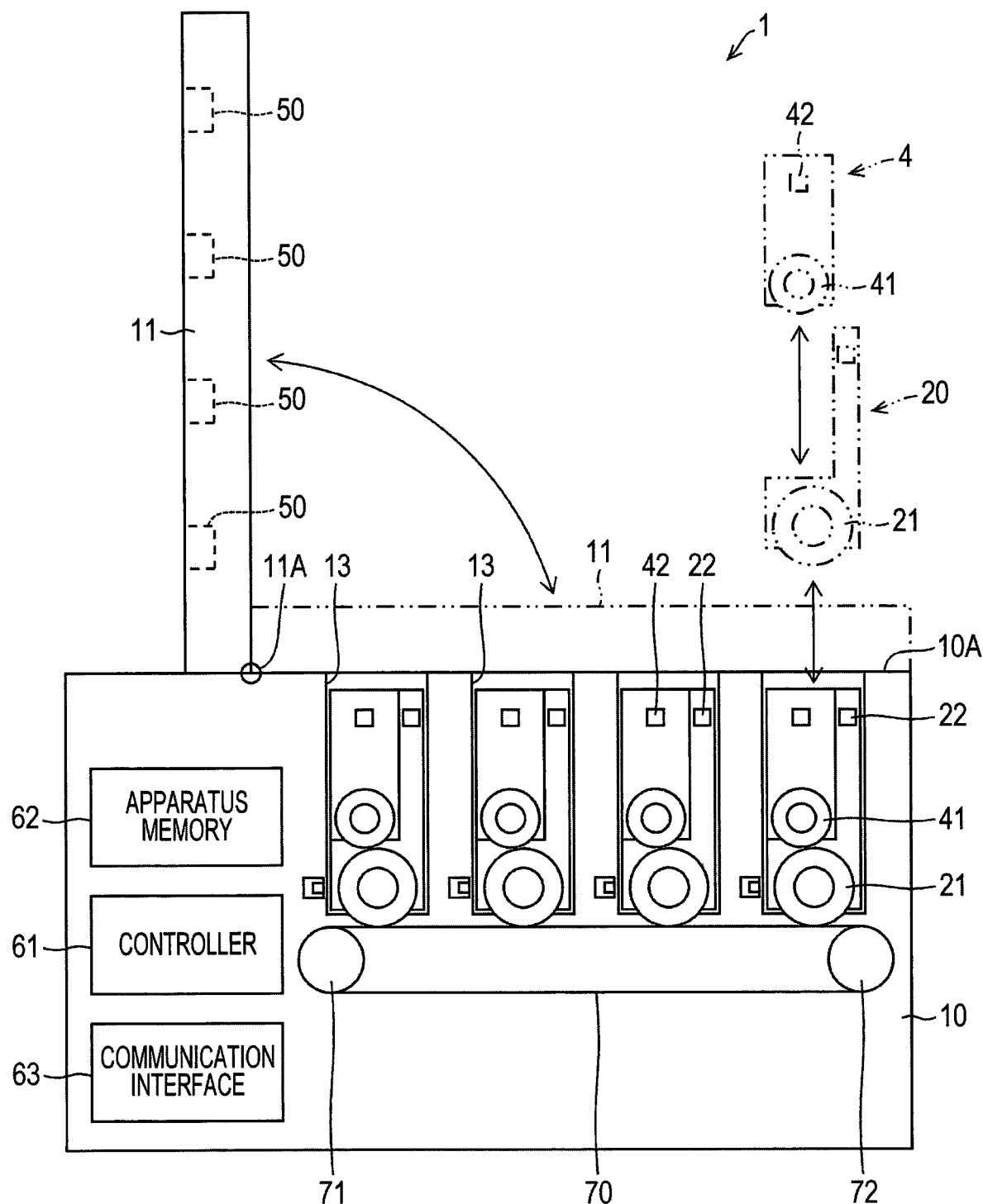
FIG. 2 is a schematic diagram of an image forming apparatus.
Figure 3:
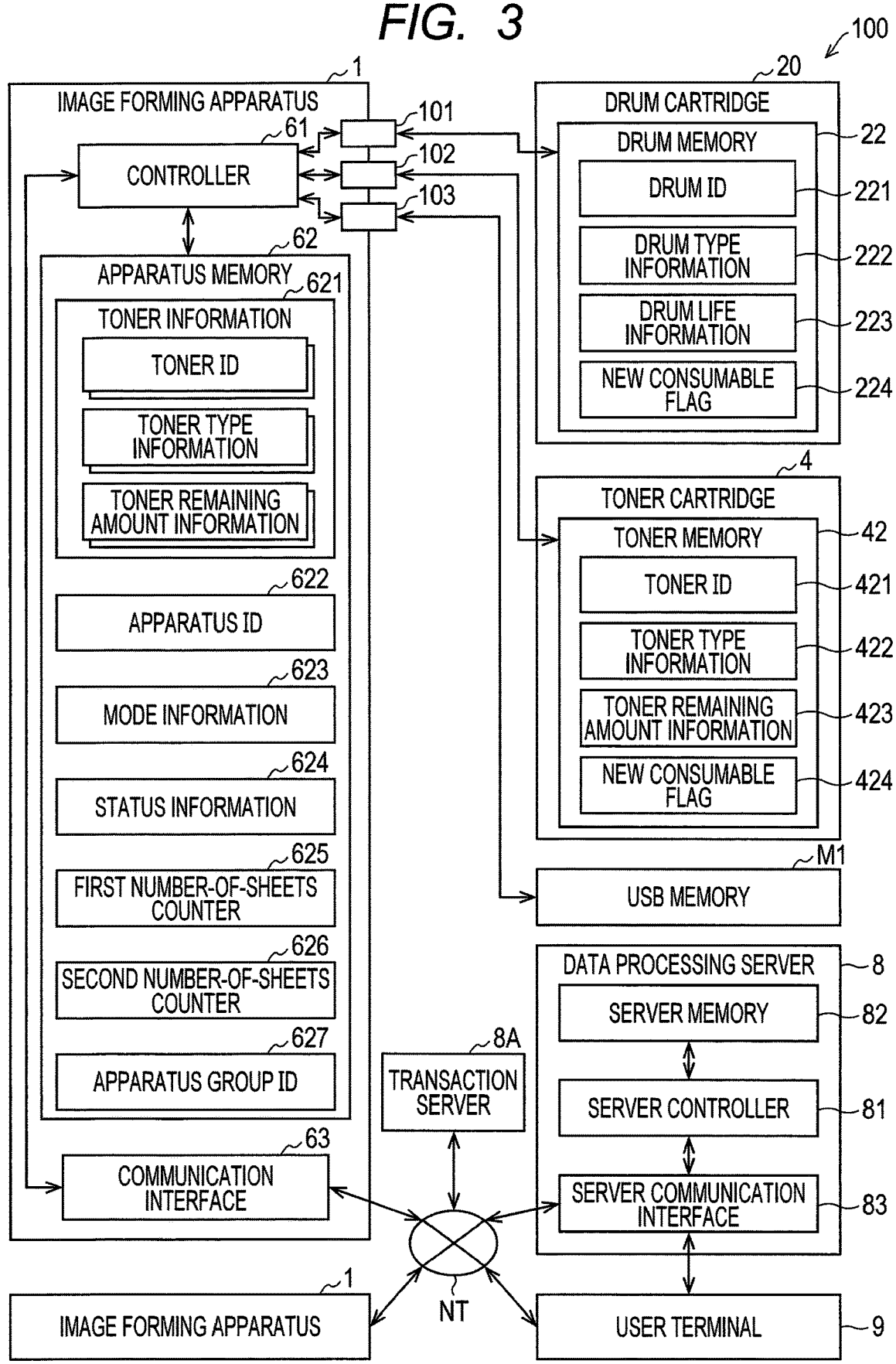
FIG. 3 is a diagram showing connection relationships among the image forming apparatus including a drum cartridge and a toner cartridge, a data processing server, a transaction server, a user terminal, and a USB memory.

FIG. 2 shows a schematic configuration of the image forming apparatus 1. FIG. 3 shows connection relationships among the image forming apparatus 1 including a drum cartridge 20 and a toner cartridge 4, the data processing server 8, the transaction server 8A, the user terminal 9, and a USB memory M1. Although two image forming apparatuses 1 are included in FIG. 3, each image forming apparatus 1 has the same configuration.

As shown in FIG. 2, the image forming apparatus 1 includes a main housing 10, a cover 11, the toner cartridge 4, the drum cartridge 20, a controller 61, an apparatus memory 62, and a communication interface 63. Although not shown, the image forming apparatus 1 may be provided with a display such as a liquid crystal display or a lamp, and an input interface such as a button. The liquid crystal display may be configured to function as an input interface by being configured integrally with a touch panel.

[Main Housing 10]

In the main housing 10 of the image forming apparatus 1, the toner cartridges 4 are attachable. Although details will be described later, each toner cartridge 4 is integrated with the drum cartridge 20 by being attached to the drum cartridge 20. That is, the toner cartridge 4 is attachable to the main housing 10 together with the drum cartridge 20 in a state where the toner cartridge 4 is attached to the drum cartridge 20. In this way, the image forming apparatus 1 including the drum cartridges 20 and the toner cartridges 4 is realized.

In the image forming apparatus 1 of this embodiment, four toner cartridges 4 need to be attached to perform printing. That is, the image forming apparatus 1 of the present embodiment is configured that four drum cartridges 20 and four toner cartridges 4 are attachable. However, the number of drum cartridges 20 and toner cartridges 4 attached to the image forming apparatus 1 is not limited to the example of FIG. 2. For example, the image forming apparatus 1 may be a monochrome printer in which one drum cartridge 20 and one toner cartridge 4 are attachable.

The toner cartridge 4 contains toner that the image forming apparatus 1 consumes during printing. That is, the toner cartridge 4 is an example of a consumable for the image forming apparatus 1. Further, the drum cartridge 20 includes a photosensitive drum 21 used during printing by the image forming apparatus 1. The drum cartridge 20 is also an example of a consumable for the image forming apparatus 1.

The main housing 10 has, for example, a rectangular box shape. The four drum cartridges 20, the four toner cartridges 4, a transfer belt 70, a controller 61, an apparatus memory 62, and a communication interface 63 are accommodated in the main housing 10. The main housing 10 includes four cartridge holding portions 13. The cartridge holding portion 13 is formed in a concave shape and has an opening. The drum cartridge 20 and the toner cartridge 4 are attached to the main housing 10 by being held by each cartridge holding portion 13.

[Cover 11]

The cover 11 of the image forming apparatus 1 is provided with light source units 50 corresponding to respective ones of the drum cartridges 20. That is, the image forming apparatus 1 includes four light source units 50. The cover 11 is pivotable (movable) about a pivot shaft 11A extending in a first direction between an open position that opens an opening 10A indicated by the solid line in FIG. 2 and a closed position that closes the opening 10A indicated by the two-dot chain line in FIG. 2. The pivotal movement of the cover 11 opens and closes the opening 10A provided at an upper end of the main housing 10.

The "first direction" indicates a direction in which a rotation center axis (development axis) of a development roller 41 in the toner cartridge 4 extends. When the cover 11 is arranged at the open position, each opening of the cartridge holding portions 13 is opened. When the cover 11 is arranged at the closed position, each opening of the cartridge holding portions 13 is covered with the cover 11.

The main housing 10 may be provided with a close sensor (not shown) at the opening 10A. The close sensor is a sensor that detects that the cover 11 is in the closed position. The close sensor may be, for example, a contact sensor or an optical sensor.

[Toner Cartridge 4]

The toner cartridge 4 includes a cartridge housing for accommodating the development roller 41 and developer (for example, toner) as an example of printing material. The cartridge housing is attachable to the main housing 10. The four toner cartridges 4 contain developers of different colors (for example, cyan, magenta, yellow, and black) as materials used for image formation.

The developer is consumable material that decreases with use. The development roller 41 is a cylindrical member extending in the first direction, and is rotatable around a development shaft extending in the first direction. When the toner cartridge 4 is attached to the drum cartridge 20, the outer peripheral surface of the photosensitive drum 21 comes into contact with the outer peripheral surface of the development roller 41.

The toner cartridge 4 also includes a toner memory 42 as an example of a consumable memory. The toner memory 42 is arranged on the outer surface of one side of the toner cartridge 4 in the first direction. The toner memory 42 is a memory from which information is read and to which information is written, such as a flash ROM (Read Only Memory) or an EEPROM (Electronically Erasable and Programmable Read Only Memory).

The toner memory 42 includes a first area 421, a second area 422, a third area 423, and a fourth area 424 in order to store information about the toner cartridge 4. The toner memory 42 stores a toner ID in the first area 421. The toner memory 42 stores toner type information in the second area 422. The toner memory 42 stores toner remaining amount information in the third area 423. The toner memory 42 stores a new consumable flag in the fourth area 424. The third area 423 and the fourth area 424 may be rewritable with data.

The toner ID is an example of second information representing unique identification information for identifying each toner cartridge 4. The toner ID may be a unique serial number of each toner cartridge 4. The toner ID may include information indicating the color of each toner cartridge 4.

The toner type information is an example of type information representing the type of the toner cartridge 4. In this embodiment, there are two types of toner cartridges 4. One is a "contract cartridge (contract-dedicated cartridge)" that is usable only with a contracted apparatus. In other words, the contract cartridge is an example of a contract consumable that is usable when a contract for the image forming apparatus 1 is made.

The other is a "normal cartridge" that is usable even with the image forming apparatus 1 that is not a contracted apparatus. In other words, the normal cartridge is an example of a normal consumable that is usable regardless of existence of a contract. The toner type information may be included in the toner ID. That is, the toner ID may include information identifying each toner cartridge 4 and information indicating the type of each toner cartridge 4.

The toner remaining amount information is information indicating the remaining amount of toner in the toner cartridge 4. The remaining amount of toner includes, for example, a value corresponding to one of a plurality of stages from full to empty. The values corresponding to the plurality of stages from full to empty is stored in the third area 423. Each stage of the remaining amount of toner stored in the toner memory 42 may be a character string such as "FULL", "HIGH", "LOW", and "EMPTY" in descending order, based on the values described above. Further, each stage of the remaining amount of toner stored in the toner memory 42 may be a numerical value such as "100%" to "0%", or information combining a character string and a numerical value.

The new consumable flag stored in the fourth area 424 is an example of first information indicating that the toner cartridge 4 is a new consumable or a used consumable (old consumable). For example, a value of "1" for the new consumable flag may mean that the toner cartridge 4 is a new consumable, and a value of "0" for the new consumable flag may mean that the toner cartridge 4 is a used consumable. The "used consumable" is a consumable that has been attached to the image forming apparatus 1 once.

[Drum Cartridge 20]

The drum cartridge 20 includes a cartridge housing that is attachable to the main housing 10. The cartridge housing includes a photosensitive drum 21 as a component used for image formation. The photosensitive drum 21 is a consumable that needs to be replaced because deterioration such as wear of the surface occurs with use. The photosensitive drum 21 is a cylindrical photoreceptor extending in the first direction. The photosensitive drum 21 is rotatable around a drum shaft extending in the first direction. The outer peripheral surface of the photosensitive drum 21 is covered with a photosensitive material.

The drum cartridge 20 may also include a drum memory 22 as an example of a consumable memory. The drum memory 22 is a memory from which information is read and to which information is written. The drum memory 22 is, for example, a flash ROM or an EEPROM.

The drum memory 22 includes a first area 221, a second area 222, a third area 223, and a fourth area 224 for storing information regarding the photosensitive drum 21 of the drum cartridge 20. The drum memory 22 stores a drum ID in the first area 221. The drum memory 22 stores drum type information in the second area 222. The drum memory 22 stores drum life information in the third area 223. The drum memory 22 stores a new consumable flag in the fourth area 224. The third area 223 and the fourth area 224 may be rewritable with data.

The drum ID is an example of second information representing unique identification information for identifying each drum cartridge 20. The drum ID may be a serial number unique to each drum cartridge 20. The drum type information is an example of type information, and is information indicating the type of the drum cartridge 20. In this embodiment, there are two types of the drum cartridge 20 that are "contract cartridge" and "normal cartridge". The drum life information is information indicating the life of the photosensitive drum 21.

The new consumable flag stored in the fourth area 224 is an example of first information indicating that the drum cartridge 20 is a new consumable or a used consumable (an old consumable). For example, a value of "1" for the new consumable flag may mean that the drum cartridge 20 is a new consumable, and a value of "0" for the new consumable flag may mean that the drum cartridge 20 is a used consumable.

[Attachment of Cartridge and Printing Mechanism]

As shown in FIG. 2, the drum cartridges 20 and the toner cartridges 4 are attached in the main housing 10 in a state where the cover 11 is located at the open position. In this state, the drum cartridges 20 and the toner cartridges 4 are inserted into the cartridge holding portions 13 through the opening 10A.

The main housing 10 includes connectors 101 and 102. When the connector 101 is electrically connected to the drum memory 22 in a state where the drum cartridge 20 is inserted in the cartridge holding portion 13, the controller 61 of the main housing 10 communicates with the drum memory 22 of the drum cartridge 20. When the connector 102 is electrically connected to the toner memory 42 in a state where the toner cartridge 4 is attached to the main housing 10, the controller 61 of the main housing 10 communicates with the toner memory 42 of the toner cartridge 4.

The four light source units 50 are attached to the inner surface of the cover 11. Each light source unit 50 is arranged to face the surface of the photosensitive drum 21 in a state where the drum cartridge 20 is attached to the main housing 10 and the cover 11 is located at the closed position. The light source unit 50 includes a plurality of light sources arranged in the first direction. The light sources irradiate the outer peripheral surface of the photosensitive drum 21 with light. The light sources are, for example, LEDs (Light Emitting Diodes).

The light source unit 50 is electrically connected to the controller 61. The controller 61 causes the plurality of light sources of the light source unit 50 to emit light according to input image data. The light source irradiates light toward the outer peripheral surface of the photosensitive drum 21. As a result, the photosensitive material on the outer peripheral surface of the photosensitive drum 21 is exposed according to the image data.

The transfer belt 70 is a component that transfers developer on the surface of the photosensitive drum 21 to printing paper. The transfer belt 70 is an example of a consumable that needs to be replaced due to wear of its surface and other deterioration as it is used. The transfer belt 70 is a belt configured to contact the photosensitive drum 21 and has an annular shape (endless belt). The outer peripheral surface of the photosensitive drum 21 is configured to contact the outer peripheral surface of the transfer belt 70. During a printing process, printing paper is conveyed between the transfer belt 70 and the photosensitive drums 21.

The transfer belt 70 is stretched between a drive roller 71 and a follow roller 72. The drive roller 71 drives the transfer belt 70. The controller 61 causes the drive roller 71 to rotate. The follow roller 72 rotates by following movement of the transfer belt 70 due to driving of the drive roller 71.

[Internal Structure of Main Housing]

The controller 61 includes, for example, an ASIC (Application Specific Integrated Circuit). The controller 61 is electrically connected to the apparatus memory 62 and the communication interface 63 provided at the main housing 10. The controller 61 causes the image forming apparatus 1 to perform a printing process and associated processes by executing various types of processing.

The controller 61 may include a processor such as a CPU (Central Processing Unit). In this case, the apparatus memory 62 may store a control program for implementing a print control method. And, the processor of the controller 61 may operate according to the control program stored in the apparatus memory 62 to execute the printing process in the image forming apparatus 1.

The controller 61 itself may include a computer-readable recording medium storing a control program. As a recording medium, a "non-temporary tangible medium" such as a ROM (Read Only Memory), a tape, a disk, a card, a semiconductor memory, a programmable logic circuit, and so on may be used. Further, a RAM (Random Access Memory) for expanding the control program may be used as the recording medium.

The control program may be supplied to the computer via any transmission medium (communication network, broadcast wave, and so on) capable of transmitting the control program. It should be noted that one aspect of the present disclosure may also be embodied in the form of a data signal embedded in a carrier wave in which the control program is embodied by electronic transmission.

When the drum cartridge 20 and the toner cartridge 4 are attached to the cartridge holding portion 13 of the main housing 10, the drum memory 22 and the toner memory 42 are electrically connected to the controller 61 as shown in FIG. 3. The controller 61 performs reading information from the connected drum memory 22 and toner memory 42 and writing and/or rewriting information to the drum memory 22 and toner memory 42.

The apparatus memory 62 is a memory from which information is read and to which information is written. The apparatus memory 62 is, for example, a flash ROM, an EEPROM, or an NVRAM (Non-Volatile Random Access Memory). The apparatus memory 62 includes a first area 621 for storing toner information, a second area 622 for storing an apparatus ID, a third area 623 for storing mode information, and a fourth area 624 for storing status information. The apparatus memory 62 further includes a fifth area 625 for storing a first number-of-sheets counter, and a sixth area 626 for storing a second number-of-sheets counter. The apparatus memory 62 may further include a seventh area 627 for storing an apparatus group ID.

The toner information is information on each toner cartridge 4 attached to the image forming apparatus 1. For example, the toner information may be data in which a toner ID read from a certain toner memory 42 is associated with toner type information and toner remaining amount information read from the same toner memory 42. The apparatus memory 62 may store the data associated in this manner for each toner cartridge 4 in the first area 621. The apparatus ID is an example of information representing unique identification information for identifying each image forming apparatus 1. The apparatus ID may be a serial number unique to each image forming apparatus 1.

The mode information is information indicating an operation mode of the image forming apparatus 1. In the present embodiment, it is assumed that the mode information is one of two modes including "contract mode" which means that the image forming apparatus 1 is registered as a contracted apparatus, and "normal mode" which means that the image forming apparatus 1 is not registered as a contracted apparatus or a contract has been canceled.

In other words, the "contract mode" means that the image forming apparatus 1 operates on the image forming system 100 as a contracted apparatus. The "normal mode" means that the image forming apparatus 1 operates not as a contracted apparatus but as a normal image forming apparatus without a contract. When the image forming apparatus 1 is shipped, a value corresponding to the normal mode is stored in the third area 623 as an initial value. The controller 61 appropriately rewrites (changes) the mode information.

The status information is information representing the status of the image forming apparatus 1. In the present embodiment, as an example, the status information may include an abnormality flag indicating whether the image forming apparatus 1 is normal or abnormal, and error information indicating the content of the abnormality if the image forming apparatus 1 is abnormal. By referring to the status information, the controller 61 determines whether a failure has occurred at the image forming apparatus 1.

The status information may include information indicating one of modes of the image forming apparatus 1, that is, (1) a normal mode, (2) an uncharged state under contract mode, (3) a charged state under contract mode, (4) a print stop state under contract mode, and (5) a print restriction state under contract mode.

The "uncharged state under contract mode" indicates a state where the image forming apparatus 1 is in the contract mode, but a use of a contract service has not started. For example, if the timing at which the transaction server 8A recognizes the image forming apparatus 1 as a contracted apparatus is different from the timing at which the transaction server 8A recognizes that the image forming apparatus 1 has started using the contract service, this "uncharged state under contract mode" may occur. On the other hand, the "charged state under contract mode" indicates a state where the image forming apparatus 1 is in the contract mode and the use of the contract service has started.

The first number-of-sheets counter is the total number of printed sheets in the image forming apparatus 1. The second number-of-sheets counter indicates the number of printed sheets printed by the image forming apparatus 1 under contract printing (printing on a contract basis). The second number-of-sheets counter may be reset to 0 each time the image forming apparatus 1 shifts from the contract mode to the normal mode, or may be the total number of printed sheets that have been printed under contract printing in the image forming apparatus 1 so far.

The apparatus group ID is an example of information representing an apparatus group of a plurality of image forming apparatuses including the image forming apparatus 1 and another image forming apparatus 1. The apparatus memory 62 stores the apparatus group ID, which enables the company of the image forming apparatus 1 to collectively manage a plurality of image forming apparatuses. The plurality of image forming apparatuses is referred to as "apparatus group".

The communication interface 63 is a communication interface that performs communication with the data processing server 8 via the network NT. The communication interface 63 outputs various data, notifications, and requests received from the data processing server 8 to the controller 61. The communication interface 63 transmits various data, notifications, and requests input from the controller 61 to the data processing server 8.

[User Terminal 9]

The user terminal 9 includes an input interface for accepting various user input operations and a communication interface for communicating with the transaction server 8A. The user registers a contracted apparatus in the transaction server 8A by performing an input operation via the user terminal 9. For example, the user inputs, to the user terminal 9, his/her own identification information and the identification information of the image forming apparatus 1 to be contracted. Upon receiving the input, the user terminal 9 transmits the input information to the transaction server 8A.

The user terminal 9 may accept an input operation related to changing the contracted apparatus in addition to registering the contracted apparatus (that is, adding the contracted apparatus). For example, the user terminal 9 may accept a user's input operation for inputting the user's own identification information, the identification information of the contracted apparatus after a contract change, and the identification information of the contracted apparatus before the contract change. Then, the user terminal 9 may transmit these three types of information to the transaction server 8A.

[Data Processing Server 8]

The data processing server 8 is a management apparatus that manages the operating state of the image forming apparatus 1. The data processing server 8 includes a server communication interface 83, a server memory 82, and a server controller 81. The server controller 81 is a CPU that controls overall operations of the data processing server 8. The server memory 82 is a storage device that stores data necessary for the data processing server 8 to operate.

The server communication interface 83 is a communication interface that performs communication with the image forming apparatus 1 and the transaction server 8A via the network NT. The server communication interface 83 outputs various data, notifications, and requests received from the image forming apparatus 1 or the transaction server 8A to the server controller 81. The server communication interface 83 transmits various data, notifications, and requests input from the server controller 81 to the image forming apparatus 1 or the transaction server 8A.

[Transaction Server 8A]

The transaction server 8A is a server for conducting transactions between the company and the user. The transaction server 8A includes a communication interface, a memory, and a controller (not shown). The controller of the transaction server 8A is a CPU that performs overall control of the transaction server 8A. The memory of the transaction server 8A is a storage device that stores data necessary for the transaction server 8A to operate. The communication interface of the transaction server 8A is a communication interface that performs communication with the user terminal 9 and the data processing server 8 via the network NT.

The memory of the transaction server 8A may have an area for storing apparatus information and an area for storing a registration table. The controller of the transaction server 8A may store the apparatus information or update the registration table in response to a notification or request received from the user terminal 9 or the data processing server 8.

The apparatus information is data in which various types of information regarding the image forming apparatus 1 are collected. The apparatus information is stored separately for each image forming apparatus 1. The apparatus information includes at least an apparatus ID. The registration table is a data table in which the image forming apparatus 1 designated by the user as a contracted apparatus is registered (stored). The registration table is also data indicating whether the image forming apparatus 1 is under contract.

[USB Memory M1]

The USB (Universal Serial Bus) memory M1 is an example of an external memory. Another example of the external memory includes an SD (Secure Digital) card. The USB memory M1 is physically connectable from outside the main housing 10. In other words, the USB memory M1 is connectable from the exterior of the main housing 10. Specifically, the USB memory M1 is connectable to the connector 103 of the main housing 10. By connecting the USB memory M1 to the connector 103, the controller 61 of the main housing 10 communicates with the USB memory M1.

[Flow of Shift from Old Apparatus to New Apparatus]

Hereinafter, the image forming apparatus 1 currently used by the user will be referred to as an old apparatus. The old apparatus has a contract mode in which the user registers the image forming apparatus 1 as a contracted apparatus, and a normal mode in which the user does not register the image forming apparatus 1 as a contracted apparatus or the contract has been canceled. In the following description, the old apparatus registered as the contracted apparatus is referred to as a printer P1 in the contract mode, and the old apparatus not registered as the contracted apparatus or the contract has been canceled is referred to as a printer P1 in the normal mode.

The image forming apparatus 1 that the user plans to use in place of the old apparatus will be referred to as a new apparatus. The new apparatus has a contract mode in which the user registers the image forming apparatus 1 as a contracted apparatus, and a normal mode in which the user does not register the image forming apparatus 1 as a contracted apparatus or the contract has been canceled. In the following description, the new apparatus registered as the contracted apparatus is referred to as a printer P2 in the contract mode, and the new apparatus not registered as the contracted apparatus or the contract has been canceled is referred to as a printer P2 in the normal mode.

The printer P1 as the old apparatus is an example of a first image forming apparatus, and the printer P2 as the new apparatus is an example of a second image forming apparatus.

Figure 4:
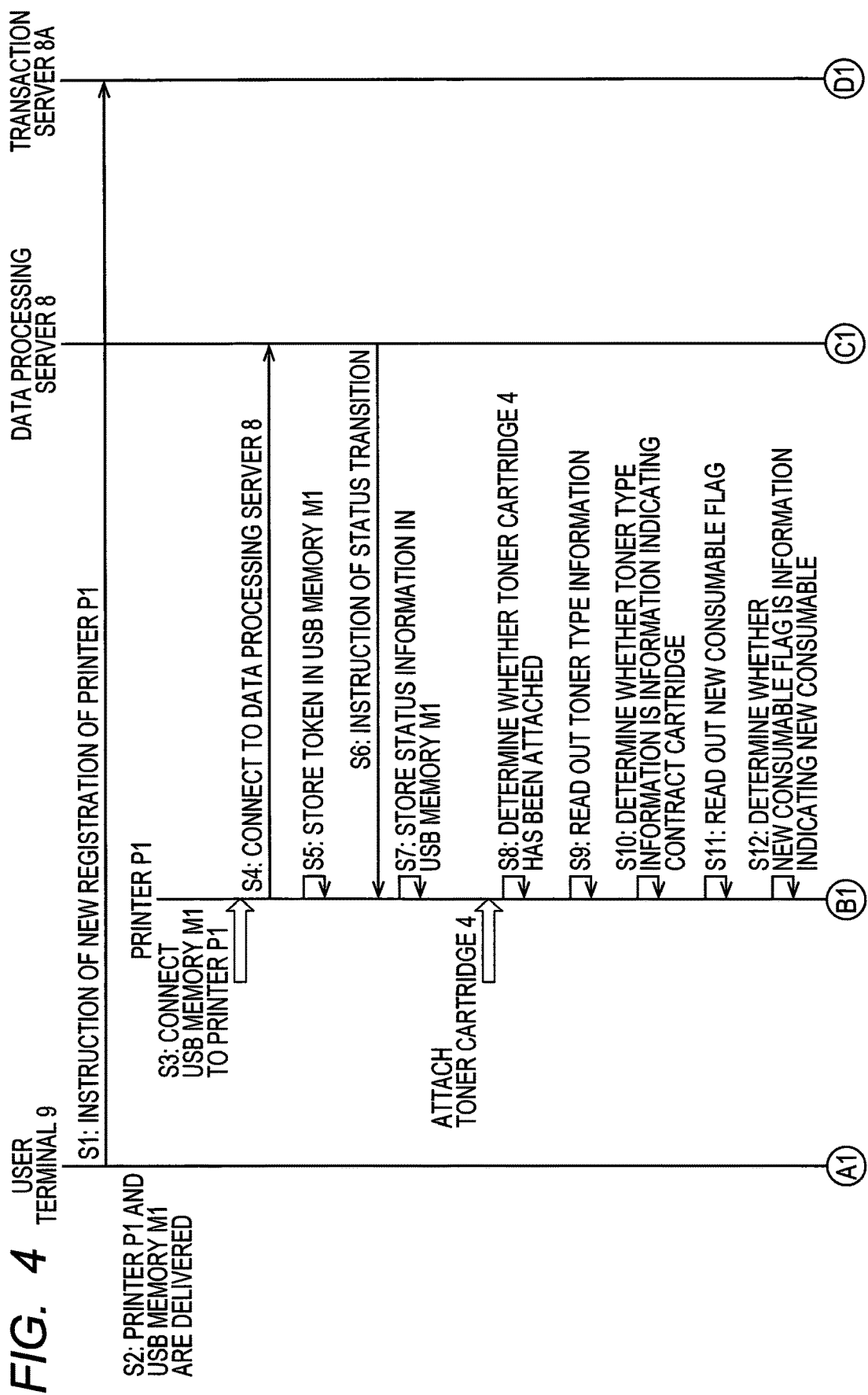
FIG. 4 is a sequence diagram showing an example of operations of various apparatuses in the image forming system.
Figure 5:
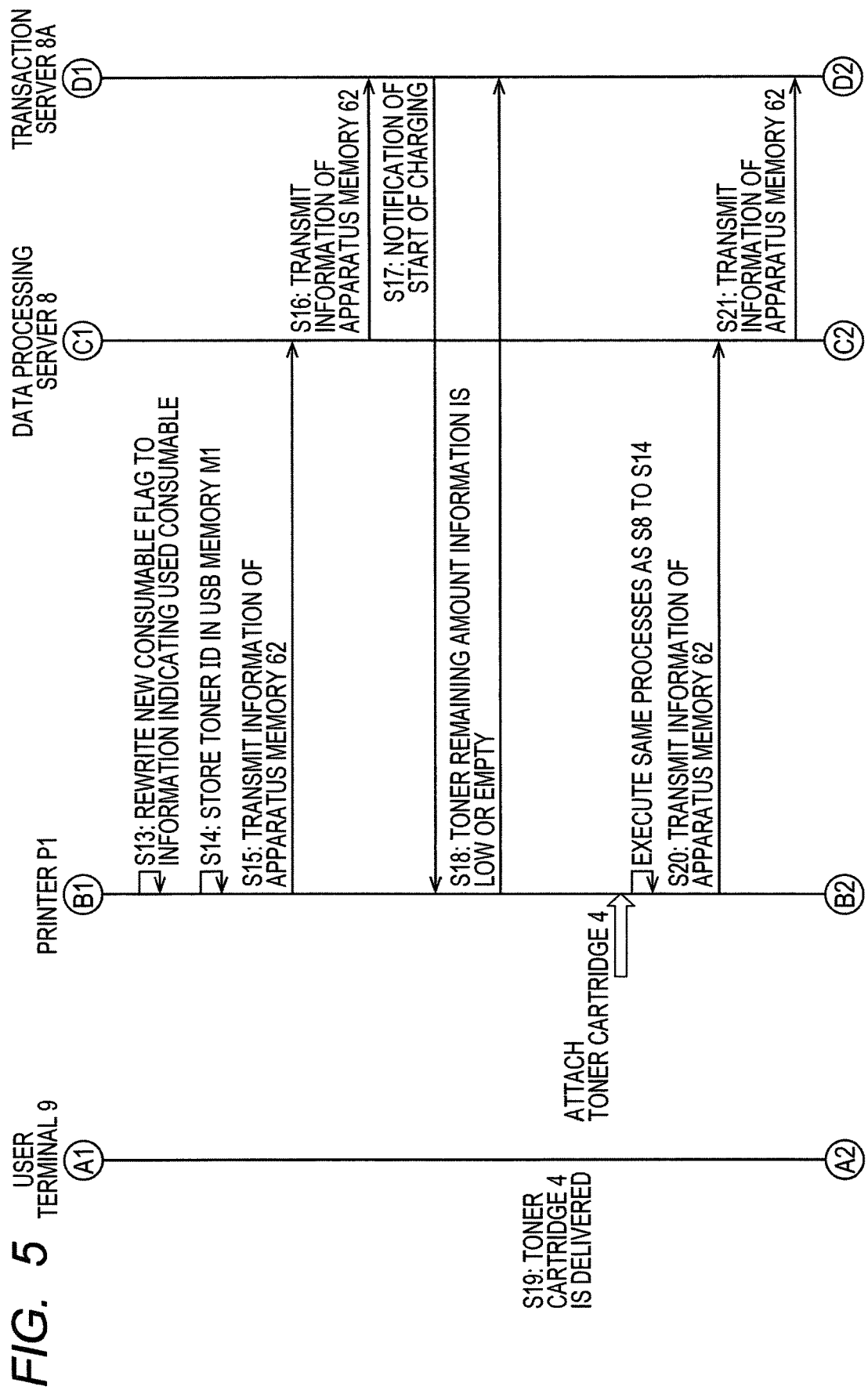
FIG. 5 is a sequence diagram showing a continuation of the operations shown in FIG. 4.
Figure 6:
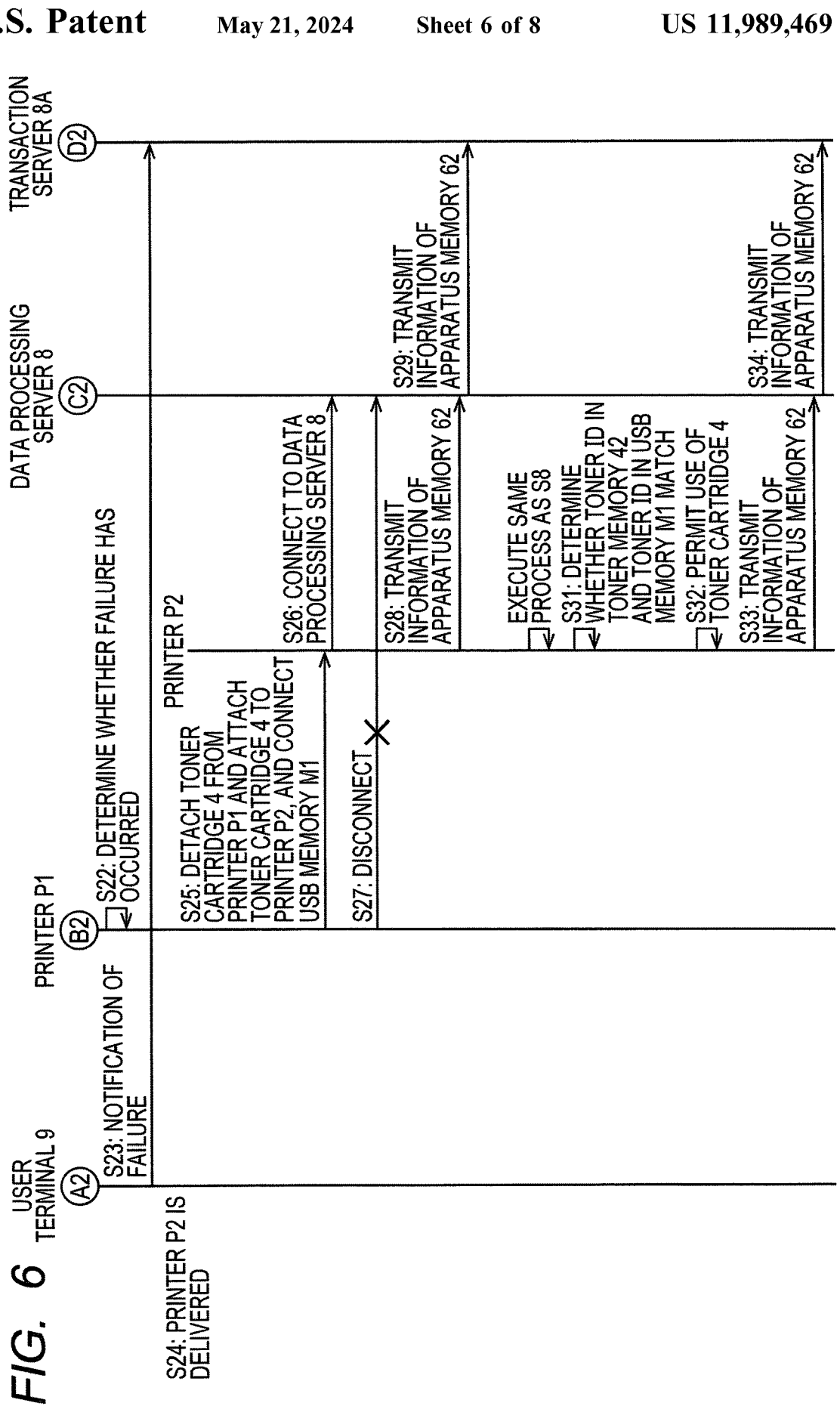
FIG. 6 is a sequence diagram showing a continuation of the operations shown in FIG.

FIG. 4 shows an example of operations of various apparatuses in the image forming system 100. FIG. 5 shows the continuation of the operation shown in FIG. 4. FIG. 6 shows the continuation of the operation shown in FIG. 5. In FIGS. 4 to 6, an operation example when the user switches from the printer P1 to the printer P2 will be described.

[Transition from Normal Mode to Contract Mode in Printer P1]

In a state where the printer P1 is in the normal mode, the user of the printer P1 performs an input operation on the user terminal 9 to newly register the printer P1 as a contracted apparatus. As shown in FIG. 4, in response to receiving the input operation, the user terminal 9 instructs the transaction server 8A to newly register the printer P1 (S1). The instruction of new registration in S1 includes a user name input by the user and the apparatus ID of the printer P1. The apparatus ID is input by the user or is acquired from the printer P1 by the user terminal 9. The transaction server 8A receives the instruction of new registration from the user terminal 9. In response to receiving the instruction of new registration, the transaction server 8A registers the printer P1 in the registration table.

When the registration of the printer P1 in the registration table is completed by the transaction server 8A, the company that manages the transaction server 8A arranges for delivery of the printer P1 and the USB memory M1 to the address of the user of the printer P1. The printer P1 and the USB memory M1 are then delivered to the user (S2). The user connects the USB memory M1 to the connector 103 of the printer P1 (S3).

After connecting the USB memory M1 to the connector 103 of the printer P1, the user turns on the printer P1. The communication interface 63 of the printer P1 connects to the server communication interface 83 of the data processing server 8 (S4). When the printer P1 connects to the data processing server 8, the server controller 81 of the data processing server 8 generates a token. The server communication interface 83 transmits the token generated by the server controller 81 to the communication interface 63 of the printer P1.

The controller 61 of the printer P1 stores, in the USB memory M1, the token transmitted to the communication interface 63 of the printer P1 by the server communication interface 83 of the data processing server 8 (S5). The token is identification information used for communications between the image forming apparatus 1 and the data processing server 8. After the server communication interface 83 transmits the token to the communication interface 63, the server controller 81 of the data processing server 8 instructs the printer P1 to shift the status (status transition) to the contract mode via the server communication interface 83 (S6).

The controller 61 of the printer P1 receives the instruction of status transition from the data processing server 8 via the communication interface 63. In response to receiving the instruction of the status transition, the controller 61 shifts the status of the printer P1 to the contract mode. Specifically, the controller 61 rewrites the mode information of the apparatus memory 62 from the normal mode to the contract mode and rewrites the status information of the apparatus memory 62 from information indicating the normal mode to information indicating the uncharged state under contract mode.

The foregoing processing allows the printer P1 to be operable as a contracted apparatus. In other words, the printer P1 shifts from the normal mode to the contract mode.

[Processing in Contract Mode in Printer P1]

Next, in a state where the printer P1 is in the contract mode, the controller 61 of the printer P1 stores the status information of the apparatus memory 62 in the USB memory M1 (S7). The controller 61 determines, at particular timing, whether the toner cartridge 4 has been attached to the main housing 10 of the printer P1 (S8). When the connector 102 is electrically connected to the toner memory 42, the controller 61 determines that the toner cartridge 4 has been attached to the main housing 10.

In response to determining that the toner cartridge 4 has been attached to the main housing 10, the controller 61 of the printer P1 reads the toner type information from the toner memory 42 (S9). In response to determining that the toner cartridge 4 has not been attached to the main housing 10, the controller 61 waits until the toner cartridge 4 is attached to the main housing 10.

The controller 61 of the printer P1 performs a first determination process of determining whether the toner type information of the toner memory 42 of the toner cartridge 4, which has been attached to the main housing 10, is information indicating a contract cartridge (S10). In response to determining in the first determination process that the toner type information is information indicating a contract cartridge, the controller 61 reads a new consumable flag from the toner memory 42 (S11).

In response to determining that the toner type information is information indicating a normal cartridge in the first determination process, regardless of whether the cartridge is a new consumable or a used consumable, the controller 61 forbids the use of the normal cartridge without referring to the first area 621 of the apparatus memory 62. Thus, the controller 61 does not perform processing after S11.

The controller 61 of the printer P1 performs a second determination process of determining whether the new consumable flag read from the toner memory 42 is information indicating a new consumable (S12). In response to determining in the second determination process that the new consumable flag is information indicating a new consumable, as shown in FIG. 5, the controller 61 performs a first rewriting process of rewriting (changing) the new consumable flag of the toner memory 42 to a value indicating a used consumable (S13). In response to determining in the second determination process that the new consumable flag is information indicating a used consumable, the controller 61 does not perform the first rewriting process and advances to the processing of S14.

In a case where the controller 61 of the printer P1 has performed the first rewriting process, the controller 61 performs a storing process of storing the toner ID in the USB memory M1 in order to permit the use of the toner cartridge 4 in the printer P2 (S14). In other words, when the new consumable flag indicates a used consumable, the controller 61 performs the storing process of S14.

The controller 61 of the printer P1 recognizes the toner cartridge 4 attached to the main housing 10, as a used consumable. When the toner cartridge 4 recognized as a used consumable is attached to the main housing 10, the controller 61 performs the storing process of storing the toner ID in the USB memory M1.

When performing the storing process of S14, the controller 61 of the printer P1 stores the mode information, the status information, and the apparatus ID of the apparatus memory 62 in the USB memory M1. The controller 61 transmits the first number-of-sheets counter and the toner information of the apparatus memory 62 to the server communication interface 83 of the data processing server 8 via the communication interface 63 (S15). The server controller 81 of the data processing server 8 transmits, to the transaction server 8A, the information of the apparatus memory 62 which has been received from the printer P1 (S16).

When the controller 61 transmits the information of the apparatus memory 62 to the data processing server 8, the controller 61 may transmit only a difference between the currently transmitted information of the apparatus memory 62 and the previously transmitted information of the apparatus memory 62 to the data processing server 8 at particular intervals. The controller 61 may transmit the information of the apparatus memory 62 to the data processing server 8 based on a request from the data processing server 8, the detection of the cover 11 at the closed position by the close sensor, or the start of connection with the data processing server 8.

The user performs an input operation on the user terminal 9 to start charging for the use of contract service in the printer P1. In response to receiving the input operation, the user terminal 9 transmits, to the transaction server 8A, a notification of the start of charging. The transaction server 8A receives the notification of the start of charging from the user terminal 9. In response to receiving the notification of the start of charging, the transaction server 8A transmit a notification of the start of charging (billing) to the printer P1 via the data processing server 8 (S17).

The printer P1 receives the notification of the start of charging from the transaction server 8A. It is assumed that the toner remaining amount information becomes "LOW" or "EMPTY" in a state where the printer P1 has received the notification of the start of charging. If the toner remaining amount information is "LOW" or "EMPTY," the controller 61 of the printer P1 transmits, to the transaction server 8A, a notification that the toner remaining amount information is "LOW" or "EMPTY" via the data processing server 8 (S18).

The transaction server 8A receives the notification that the toner remaining amount information is "LOW" or "EMPTY" from the printer P1. When the transaction server 8A receives the toner remaining amount information, the company that manages the transaction server 8A arranges for delivery of the toner cartridge 4, which is a contract cartridge, to the address of the user of the printer P1. Then, the toner cartridge 4 is delivered to the user (S19).

The controller 61 of the printer P1 performs the same processes as S8 to S14. After storing the toner ID in the USB memory M1, the controller 61 transmits the first number-of-sheets counter and the toner information of the apparatus memory 62 to the server communication interface 83 of the data processing server 8 via the communication interface 63 (S20). The server controller 81 of the data processing server 8 transmits, to the transaction server 8A, the information of the apparatus memory 62 which has been received from the printer P1 (S21).

[Shift from Printer P1 to Printer P2]

Thereafter, as shown in FIG. 6, it is assumed that a failure has occurred at the printer P1 in the contract mode. The controller 61 determines, at particular timing, whether a failure has occurred at the printer P1 (S22). For example, when the status information stored in the apparatus memory 62 indicates the occurrence of a failure in the printer P1, the controller 61 determines that a failure has occurred at the printer P1. It is assumed that the failure that is determined here is a failure requiring the replacement of the printer P1, for example, an unrecoverable failure of a printing function.

The controller 61 of the printer P1 may control a display (not shown) of the printer P1 to display contents that prompt the user to shift the toner cartridge 4 and the USB memory M1 to the printer P2.

If a failure has occurred at the printer P1, the user performs an input operation on the user terminal 9 to provide a notification about the failure of the printer P1. In response to receiving the input operation, the user terminal 9 transmits, to the transaction server 8A, a notification about the failure of the printer P1 (S23). The transaction server 8A receives the notification about the failure of the printer P1 from the user terminal 9. When the transaction server 8A receives the notification about the failure of the printer P1, the company that manages the transaction server 8A arranges for delivery of the printer P2 to the address of the user of the printer P1. Thereafter, the printer P2 is delivered to the user (S24). At this time, the printer P2 is in the normal mode.

The user attaches the toner cartridge 4, which has been attached to the main housing 10 of the printer P1, to the main housing 10 of the printer P2. The user connects the USB memory M1, which has been connected to the connector 103 of the printer P1, to the connector 103 of the printer P2 (S25). Thereafter, the user turns on the printer P2. At this time, the printer P1 is in the contract mode and the printer P2 is in the normal mode.

In a state where the printer P2 is in the normal mode, the communication interface 63 of the printer P2 connects to the server communication interface 83 of the data processing server 8 (S26). The token stored in the USB memory M1 allows the connection of the communication interface 63 of the printer P2 to the data processing server 8. At this time, the printer P2 becomes operable as a contracted apparatus. In other words, the printer P2 shifts from the normal mode to the contract mode.

When the USB memory M1 is removed from the connector 103 of the printer P1, the communication interface 63 of the printer P1 disconnects communications with the data processing server 8 (S27). At this time, the printer P1 becomes inoperable as a contracted apparatus. In other words, the printer P1 shifts from the contract mode to the normal mode.

In a state where the printer P2 is in the contract mode, the controller 61 of the printer P2 transmits the first number-of-sheets counter and the toner information of the apparatus memory 62 to the server communication interface 83 of the data processing server 8 via the communication interface 63 (S28). The server controller 81 of the data processing server 8 transmits, to the transaction server 8A, the information of the apparatus memory 62 which has been received from the printer P2 (S29).

The controller 61 of the printer P2 performs the same process as S8 like the controller 61 of the printer P1. It is assumed that the controller 61 of the printer P2 determines that the toner cartridge 4 has been attached to the main housing 10 of the printer P2. The controller 61 of the printer P2 performs a third determination process of determining whether the toner ID stored in the toner memory 42 and the toner ID stored in the USB memory M1 are identical to each other (S31).

In response to determining that the toner cartridge 4 has not been attached to the main housing 10, the controller 61 of the printer P2 waits until the toner cartridge 4 is attached to the main housing 10.

In response to determining in the third determination process that the toner ID stored in the toner memory 42 and the toner ID stored in the USB memory M1 are identical to each other, the controller 61 of the printer P2 performs a process of permitting the use of the toner cartridge 4 (S32).

In response to determining in the third determination process that the toner ID stored in the toner memory 42 and the toner ID stored in the USB memory M1 are not identical to each other, the controller 61 of the printer P2 does not permit the use of the toner cartridge 4. Thus, the controller 61 of the printer P2 does not perform processing after S32.

After the controller 61 of the printer P2 permits the use of the cartridge, the controller 61 of the printer P2 transmits the first number-of-sheets counter and the toner information of the apparatus memory 62 to the server communication interface 83 of the data processing server 8 via the communication interface 63 (S33). The server controller 81 of the data processing server 8 transmits, to the transaction server 8A, the information of the apparatus memory 62 which has been received from the printer P2 (S34).

With this processing, the controller 61 of the printer P1 stores the toner ID in the USB memory M1 in a state where the printer P1 is in the contract mode. The toner memory 42 stores the toner ID. The user connects the USB memory M1 storing the toner ID to the printer P2 in a state where the printer P2 is in the normal mode, and attaches the toner cartridge 4, which has been used in the printer P1, to the printer P2.

The printer P2 recognizes that the toner ID is stored in the toner memory 42 and the USB memory M1, thereby shifting from the normal mode to the contract mode.

Thereafter, in a state where the printer P2 is in the contract mode, the printer P2 determines whether the toner ID stored in the toner memory 42 and the toner ID stored in the USB memory M1 are identical to each other. If the toner ID stored in the toner memory 42 and the toner ID stored in the USB memory M1 are identical to each other, the printer P2 permits the use of the toner cartridge 4 which has been used in the printer P1.

Thus, simply by connecting the USB memory M1 to the printer P2 and attaching the toner cartridge 4 having been used in the printer P1 to the printer P2 in a state where the printer P2 is in the normal mode, the toner cartridge 4 having been used in the printer P1 can be used in the printer P2 by the user. This enables the user to easily shift from the printer P1 to the printer P2 when the toner type information is information indicating a contract cartridge and the new consumable flag of the toner cartridge 4 indicates a used consumable.

Users change contracted apparatuses due to various reasons. Conventionally, a contracted apparatus is changed in the following steps: For example, first, a new apparatus is delivered to a user. Second, the contract of the new apparatus is made. Third, the service provider supplies a contract consumable for the new apparatus to the user based on the contract. That is, a flat-rate printing service for the new apparatus is not quickly available to the user, resulting in an inconvenience that the user has to wait for a period until the arrival of the contract consumable for the new apparatus after the purchase of the new apparatus.

The present embodiment allows the user to use the toner cartridge 4 having been used in the old apparatus in the new apparatus, without the need for waiting for a period until the arrival of a contract consumable for the new apparatus after the purchase of the new apparatus.

EMBODIMENT 2

Embodiment 2 of the present disclosure will be described below. For convenience of description, members having the same functions as the members described in Embodiment 1 are denoted by the same reference numerals, and description thereof will not be repeated.

Figure 7:
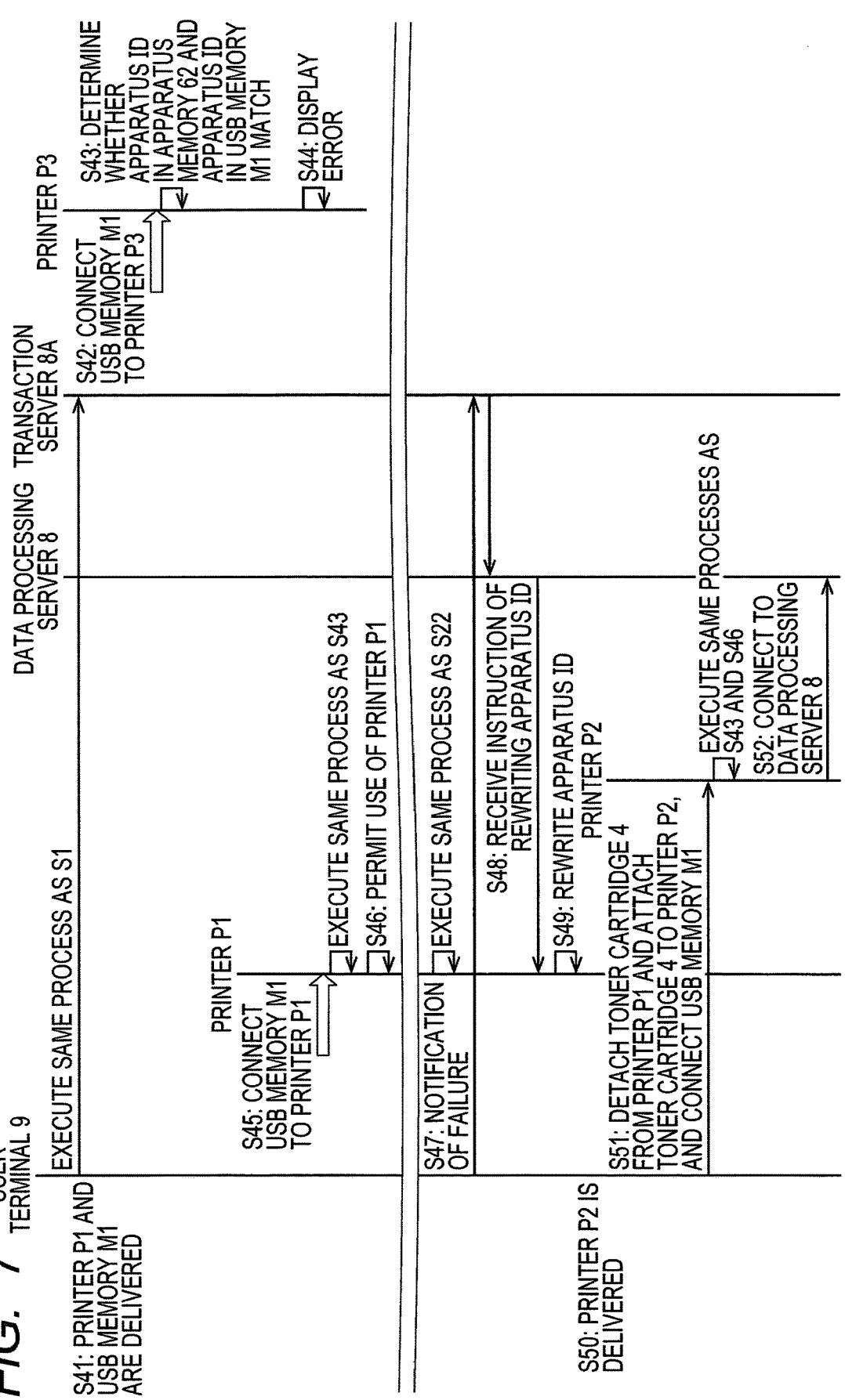
FIG. 7 is a sequence diagram showing an example of operations of various apparatuses in an image forming system.

FIG. 7 shows an example of the operations of the various apparatuses in the image forming system 100 of the present embodiment. The user of the printer P1 performs an input operation on the user terminal 9 to newly register the printer P1 as a contracted apparatus. As shown in FIG. 7, the user terminal 9 performs the same process as S1 of FIG. 4.

The transaction server 8A receives the instruction of new registration from the user terminal 9. In response to receiving the instruction of new registration, the transaction server 8A registers the printer P1 in the registration table. When the registration of the printer P1 in the registration table is completed by the transaction server 8A, the company that manages the transaction server 8A arranges for delivery of the printer P1 and the USB memory M1 to the address of the user of the printer P1. The printer P1 and the USB memory M1 are then delivered to the user (S41). It is assumed that the USB memory M1 stores an apparatus ID indicating identification information of the printer P1.

The user connects the USB memory M1 to the connector 103 of a printer P3, which is an example of another image forming apparatus 1 different from the printer P1 and the printer P2 (S42). After connecting the USB memory M1 to the connector 103 of the printer P3, the user turns on the printer P3. The controller 61 of the printer P3 performs a fourth determination process of determining whether an apparatus ID stored in the apparatus memory 62 of the printer P3 and an apparatus ID stored in the USB memory M1 are identical to each other (S43).

In response to determining in the fourth determination process that the apparatus ID stored in the apparatus memory 62 of the printer P3 and the apparatus ID stored in the USB memory M1 are not identical to each other, the controller 61 of the printer P3 does not permit the use of the printer P3. The controller 61 of the printer P3 then displays an error on a display (not shown) of the printer P3 (S44). The error displayed on the display may include a content indicating that the printer P3 is not usable.

The user connects the USB memory M1 to the connector 103 of the printer P1 (S45). The controller 61 of the printer P1 performs the same process as S43 like the controller 61 of the printer P3. It is assumed that the controller 61 of the printer P1 determines in the fourth determination process that the apparatus ID stored in the apparatus memory 62 of the printer P1 and the apparatus ID stored in the USB memory M1 are identical to each other. The controller 61 of the printer P1 permits the use of the printer P1 (S46).

After the controller 61 of the printer P1 permits the use of the printer P1, the same processes as S4 to S22 of FIGS. 4 to 6 is performed. If a failure occurs in the printer P1, the user performs an input operation on the user terminal 9 to provide a notification about the failure of the printer P1. In response to receiving the input operation, the user terminal 9 transmits, to the transaction server 8A, a notification about the failure of the printer P1 (S47).

The transaction server 8A receives the notification about the failure of the printer P1 from the user terminal 9. In response to receiving the notification about the failure of the printer P1, the transaction server 8A transmits an instruction to rewrite the apparatus ID to the server communication interface 83 of the data processing server 8. The server controller 81 of the data processing server 8 transmits, via the server communication interface 83, the instruction to rewrite the apparatus ID to the communication interface 63 of the printer P1.

The controller 61 of the printer P1 performs a reception process of receiving the instruction to rewrite the apparatus ID stored in the USB memory M1, from the data processing server 8, via the communication interface 63 (S48). In response to receiving the instruction, the controller 61 performs a second rewriting process of rewriting (changing) the apparatus ID stored in the USB memory M1 into an apparatus ID indicating identification information of the printer P2 (S49).

When the transaction server 8A has received the notification about the failure of the printer P1, the company that manages the transaction server 8A arranges for delivery of the printer P2 to the address of the user of the printer P1. Then, the printer P2 is delivered to the user (S50).

The user attaches the toner cartridge 4, which has been attached to the main housing 10 of the printer P1, to the main housing 10 of the printer P2 and connects the USB memory M1, which has been connected to the connector 103 of the printer P1, to the connector 103 of the printer P2 (S51). The user turns on the printer P2.

The controller 61 of the printer P2 performs the same process as S43 like the controller 61 of the printer P3. The controller 61 of the printer P2 performs the same process as S46 like the controller 61 of the printer P1. The communication interface 63 of the printer P2 connects to the server communication interface 83 of the data processing server 8 (S52).

With this processing, the user connects, to the printer P2, the USB memory M1 storing the apparatus ID indicating identification information of the printer P2, which allows the printer P2 to recognize that the USB memory M1 stores the apparatus ID of the printer P2. Based on a determination that the USB memory M1 stores the apparatus ID indicating the identification information of the printer P2, the printer P2 permits the use of the printer P2.

Thus, the user can use the printer P2 only by connecting the USB memory M1 to the printer P2. The processing of S43 prevents the user from using printers other than the printer P2.

EMBODIMENT 3

Embodiment 3 of the present disclosure will be described below. For convenience of description, members having the same functions as the members described in Embodiment 1 are denoted by the same reference numerals, and description thereof will not be repeated.

Figure 8:
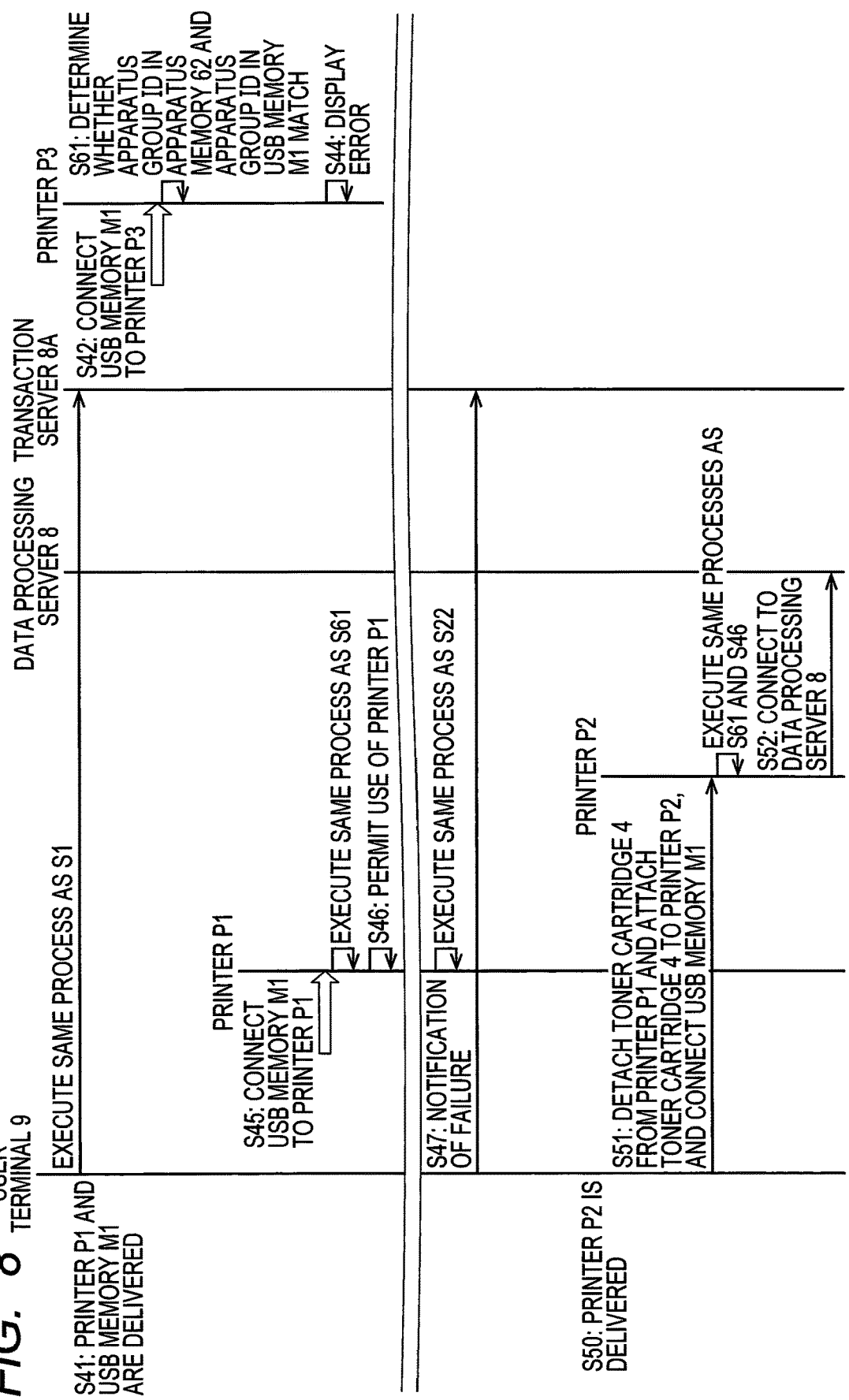
FIG. 8 is a sequence diagram showing an example of operations of various apparatuses in an image forming system.

FIG. 8 shows an example of the operations of the various apparatuses in the image forming system 100 of the present embodiment. In FIG. 8, the operations from the beginning to S42 are identical to those in FIG. 7. It is assumed that the USB memory M1 stores an apparatus group ID indicating a plurality of image forming apparatuses including the printer P1 and the printer P2 and not including the printer P3.

After connecting the USB memory M1 to the connector 103 of the printer P3, the user turns on the printer P3. The controller 61 of the printer P3 performs a fifth determination process of determining whether an apparatus group ID stored in the apparatus memory 62 of the printer P3 and an apparatus group ID stored in the USB memory M1 are identical to each other (S61).

In response to determining in the fifth determination process that the apparatus group ID stored in the apparatus memory 62 of the printer P3 and the apparatus group ID stored in the USB memory M1 are not identical to each other, the controller 61 of the printer P3 does not permit the use of the printer P3. The controller 61 of the printer P3 then performs the same process as S44.

The user performs the same operation as S45, and the controller 61 of the printer P1 performs the same process as S61 like the controller 61 of the printer P3. The controller 61 of the printer P1 performs the same process as S46. After the controller 61 of the printer P1 permits the use of the printer P1, the same processes as S4 to S22 of FIGS. 4 to 6 is performed. If a failure occurs in the printer P1, the user terminal 9 performs the same process as S47.

When the transaction server 8A receives a notification about the failure of the printer P1, the same operations as S50 and S51 are performed, and the user turns on the printer P2. The controller 61 of the printer P2 performs the same process as S61 like the controller 61 of the printer P3. The controller 61 of the printer P2 performs the same process as S46 like the controller 61 of the printer P1. The communication interface 63 of the printer P2 performs the same process as S52.

With this processing, the user connects the USB memory M1 to the printer P2, which allows the printer P2 to recognize that the USB memory M1 stores the apparatus group ID indicating a plurality of image forming apparatuses. The printer P2 performs a process of permitting the use of the printer P2 with reference to the apparatus group ID stored in the USB memory M1. Thus, only by connecting the USB memory M1 to the printer P2 included in the plurality of image forming apparatuses indicated by the apparatus group ID, the user can use the printer P2 without rewriting information stored in the USB memory M1 by the controller 61 of the printer P1.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described invention are provided below.

Various Modifications

[Modification 1]

The four toner cartridges 4 may be attached to a common drum cartridge 20. In this case, the cartridge holding portion 13 may have a shape configured to hold one drum cartridge 20.

[Modification 2]

The drum cartridge 20 may include the development roller 41 in addition to the photosensitive drum 21, the cartridge housing, the drum memory 22, and a charger. In the cartridge housing, the photosensitive drum 21, the drum memory 22, the charger, and the development roller 41 are provided. The toner cartridge 4 includes the cartridge housing and the toner memory 42 but does not have the development roller 41. The cartridge housing contains the toner. An outer peripheral surface of the development roller 41 is in contact with an outer peripheral surface of the photosensitive drum 21 inside the drum cartridge 20.

[Modification 3]

The toner cartridge 4 may be constituted by two cartridges (not shown). A first cartridge of the two cartridges constituting the toner cartridge 4 includes the development roller 41. A second cartridge of the two cartridges constituting the toner cartridge 4 includes the cartridge housing and the toner memory 42. The cartridge housing contains the toner.

[Modification 4]

The image forming apparatus 1 may include one cartridge (not shown) instead of the drum cartridge 20 and the toner cartridge 4. The one cartridge includes the photosensitive drum 21, the cartridge housing, the memory, the charger, and the development roller 41. The outer peripheral surface of the development roller 41 is in contact with the outer peripheral surface of the photosensitive drum 21 inside the one cartridge. The cartridge housing of the one cartridge contains the toner.

[Modification 5]

In the image forming apparatus 1, the drum cartridge 20 and the toner cartridge 4 may be detachably attached mutually independently of each other with respect to the main housing 10.

[Modification 6]

The image forming apparatus 1 may be an MFP (Multifunction Printer or Multifunction Peripheral) also including other functions as a scanner or a facsimile. Even when the image forming apparatus 1 is an MFP, the image forming apparatus 1 may execute the various types of processing described in the above-described embodiment similarly to the image forming apparatus 1 of the above-described embodiment. The image forming apparatus 1 of this modification has effects similar to those of the image forming apparatus 1 of the above-described embodiment.

[Modification 7]

Print base material (print medium) of the image forming apparatus 1 is not limited to paper. For example, the print base material may be a tape. In a case where the print base material is a tape, a tape cassette which supplies a tape is attached to the image forming apparatus 1. The image forming apparatus 1 performs printing on the tape conveyed from the tape cassette. In this case, the image forming apparatus 1 may be a laser printer or an inkjet printer.

[Modification 8]

The image forming apparatus 1 may be an inkjet printer. In a case where the image forming apparatus 1 is the inkjet printer, not the drum cartridge 20 or the toner cartridge 4 described in the embodiments but an ink cartridge is attached to the cartridge holding portion 13 of the image forming apparatus 1.

The number of ink cartridges attached to the image forming apparatus 1 is not particularly limited. For example, in the image forming apparatus 1, four ink cartridges in total corresponding to each of four colors of cyan, magenta, yellow, and black may be attached or only a cartridge corresponding to one color of black may be attached.

The ink cartridge includes a cartridge housing filled with ink which is consumable material, and an ink memory that stores ink cartridge information. The ink cartridge information may include, for example, an ink ID, ink type information, ink remaining amount information, and a new consumable flag.

The ink ID is identification information of the ink cartridge and is information included in the ink cartridge information instead of the toner ID in the above-described embodiment. The ink type information is information indicating a type of the ink cartridge and is information included in the ink cartridge information instead of the toner type information in the above-described embodiment. The ink remaining amount information is information indicating a remaining amount of the ink in the ink cartridge and is information included in the ink cartridge information instead of the toner remaining amount information in the above-described embodiment. The new consumable flag is information corresponding to information of the same name in the information related to the toner cartridge 4 in the above-described embodiment, in which the "toner" in the information related to the toner cartridge 4 is replaced with the "ink" and the "toner cartridge" with the "ink cartridge".

In the cartridge housing of the ink cartridge, an agitator for agitating the ink may be provided. The agitator operates in accordance with an instruction from the controller 61 in a state where the ink cartridge is attached to the image forming apparatus 1.

In a case where the image forming apparatus 1 is an inkjet printer, a flow of each processing illustrated in each flowchart described in the above-described embodiment is the same. Specifically, when the image forming apparatus 1 is an inkjet printer, the "toner cartridge 4" and the "toner memory 42" of the above-described embodiment may be read as an ink cartridge and an ink memory, respectively.

Similarly, the "drum cartridge 20" and the "drum memory 22" of the above-described embodiment may be read as a consumable and a consumable memory, respectively. Various types of information included in the information related to the toner cartridge 4 in the above-described embodiment may be read as corresponding information in the ink cartridge information. The image forming apparatus 1 of this modification has effects similar to those of the image forming apparatus 1 of the above-described embodiment.

Example of Implementation by Software

The functions of the image forming apparatus 1 may be realized by a program for causing a computer to function as the image forming apparatus 1, the program for operating the computer as the controller 61 of the image forming apparatus 1.

In this case, the image forming apparatus 1 includes a computer having at least one controller (for example, processor) and at least one storage device (for example, memory) as hardware for executing the above program. By executing the above program using the controller and the storage device, each function described in each of the above embodiments is realized.

The program may be recorded on one or more non-transitory computer-readable recording medium. This recording medium may or may not be included in the image forming apparatus 1. In the latter case, the program may be supplied to the image forming apparatus 1 via any wired or wireless transmission medium.

Also, part or all of the functions of the controller 61 may be realized by a logic circuit. For example, an integrated circuit in which logic circuits functioning as the above control blocks are formed is also included in the scope of the present disclosure.

What is claimed is:

1. An image forming apparatus comprising:
   a main housing;
   a consumable attachable to the main housing, the consumable including a consumable memory, the consumable memory storing type information and first information, the type information indicating whether the consumable is a contract consumable or a normal consumable, the contract consumable being a consumable that is usable when a contract for the image forming apparatus is made, the normal consumable being a consumable that is usable regardless of whether the contract is made, the first information indicating whether the consumable is a new consumable or a used consumable;
   an external memory physically connectable to the main housing from outside the main housing; and
   a controller configured to:
      determine whether the type information is information indicating the contract consumable; and
      in response to determining that the type information is information indicating the contract consumable in a case where the first information indicates the used consumable, store second information in the external memory, the second information being information for permitting a use of the consumable in an other image forming apparatus different from the image forming apparatus.

2. The image forming apparatus according to claim 1, wherein the second information is unique identification information for identifying the consumable.

3. The image forming apparatus according to claim 1, wherein the controller is configured to:
   determine whether the first information is information indicating the new consumable;
   in response to determining that the first information is information indicating the new consumable, change the first information from the information indicating the new consumable to information indicating the used consumable; and
   in response to changing the first information from the information indicating the new consumable to information indicating the used consumable, store the second information in the external memory.

4. The image forming apparatus according to claim 1, wherein the second information is unique identification information for identifying the image forming apparatus; and
   wherein the controller is configured to:
      receive, from an external apparatus, an instruction of changing the second information stored in the external memory; and
      in response to receiving the instruction of changing the second information, change the second information stored in the external memory to identification information of the other image forming apparatus.

5. The image forming apparatus according to claim 4, wherein the controller is configured to:
   determine whether a failure occurs at the image forming apparatus; and
   in response to determining that a failure occurs at the image forming apparatus, transmit a notification of the failure to the external apparatus; and
   wherein the external apparatus is configured to:
      in response to receiving the notification, transmit, to the image forming apparatus, the instruction of changing the second information.

6. The image forming apparatus according to claim 1, further comprising an apparatus memory,
   wherein the apparatus memory stores apparatus group information indicating a plurality of image forming apparatuses including the image forming apparatus and the other image forming apparatus.

7. The image forming apparatus according to claim 1, wherein the external memory is a USB memory.

8. The image forming apparatus according to claim 1, wherein the consumable is a toner cartridge configured to contain toner.

9. A control method comprising:
   determining, by a first image forming apparatus, whether type information is information indicating a contract consumable, a consumable being attachable to the first image forming apparatus, the consumable including a consumable memory, the consumable memory storing the type information and first information, the type information indicating whether the consumable is the contract consumable or a normal consumable, the contract consumable being a consumable that is usable when a contract for the first image forming apparatus is made, the normal consumable being a consumable that is usable regardless of whether the contract is made, the first information indicating whether the consumable is a new consumable or a used consumable;
   in response to determining that the type information is information indicating the contract consumable in a case where the first information indicates the used consumable, storing, by the first image forming apparatus, second information in an external memory, the external memory being attached to the first image forming apparatus from outside the first image forming apparatus;
   attaching the external memory and the consumable to a second image forming apparatus different from the first image forming apparatus, the second image forming apparatus including an apparatus memory;
   determining, by the second image forming apparatus, whether the second information stored in the consumable memory or the apparatus memory and the second information stored in the external memory match; and
   in response to determining that the second information stored in the consumable memory or the apparatus memory and the second information stored in the external memory match, permitting, by the second image forming apparatus, a use of the consumable.

10. The control method according to claim 9, wherein the second information is unique identification information for identifying the consumable.

11. The control method according to claim 9, further comprising:
  determining, by the first image forming apparatus, whether the first information is information indicating the new consumable;
  in response to determining that the first information is information indicating the new consumable, changing, by the first image forming apparatus, the first information from the information indicating the new consumable to information indicating the used consumable; and
  in response to changing the first information from the information indicating the new consumable to information indicating the used consumable, storing, by the first image forming apparatus, the second information in the external memory.

12. The control method according to claim 10, wherein the second image forming apparatus determines whether the second information stored in the consumable memory and the second information stored in the external memory match; and in response to determining that the second information stored in the consumable memory and the second information stored in the external memory match, permits the use of the consumable.

13. The control method according to claim 9, wherein the second information is unique identification information for identifying the first image forming apparatus or the second image forming apparatus,
  the control method further comprising:
    receiving, by the first image forming apparatus, from an external apparatus, an instruction of changing the second information stored in the external memory; and
    in response to receiving the instruction of changing the second information, changing, by the first image forming apparatus, the second information stored in the external memory to identification information of the second image forming apparatus.

14. The control method according to claim 13, further comprising:
  determining whether a failure occurs at the first image forming apparatus; and
  in response to determining that a failure occurs at the first image forming apparatus, transmitting a notification of the failure to the external apparatus; and
  wherein the external apparatus is configured to:
    in response to receiving the notification, transmit, to the first image forming apparatus, the instruction of changing the second information.

15. The control method according to claim 13, wherein the second image forming apparatus determines whether the second information stored in the apparatus memory and the second information stored in the external memory match; and in response to determining that the second information stored in the apparatus memory and the second information stored in the external memory match, permits the use of the consumable.

16. The control method according to claim 9, wherein the first image forming apparatus includes an apparatus memory; and
  wherein the apparatus memory of the first image forming apparatus and the apparatus memory of the second image forming apparatus store same apparatus group information indicating a plurality of image forming apparatuses including the first image forming apparatus and the second image forming apparatus.

17. The control method according to claim 9, wherein the external memory is a USB memory.

18. The control method according to claim 9, wherein the consumable is a toner cartridge configured to contain toner.

* * * * *